(12) United States Patent
Lam et al.

(10) Patent No.: US 10,114,425 B2
(45) Date of Patent: Oct. 30, 2018

(54) PORTABLE ELECTRONIC DEVICE

(71) Applicant: ASUSTeK COMPUTER INC., Taipei (TW)

(72) Inventors: Jack Lam, Taipei (TW); Yung-Hsiang Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/840,095

(22) Filed: Dec. 13, 2017

(65) Prior Publication Data
US 2018/0181167 A1     Jun. 28, 2018

(30) Foreign Application Priority Data
Dec. 23, 2016   (TW) .............................. 105143105 A (51) Int. Cl.
*G06F 1/16*        (2006.01)
(52) U.S. Cl.
CPC .................................. *G06F 1/1681* (2013.01)
(58) Field of Classification Search
None
See application file for complete search history.

(56) References Cited

U.S. PATENT DOCUMENTS

| | | |
|---|---|---|
| 9,052,869 B2 | 6/2015 | Wang et al. |
| 9,312,633 B1 * | 4/2016 | Szeto .................. H01R 13/6205 |
| 9,645,608 B1 * | 5/2017 | Tsai ...................... G06F 1/1616 |
| 2011/0216485 A1 * | 9/2011 | Kang .................. H04M 1/0254 |
| | | 361/679.01 |
| 2012/0275092 A1 | 11/2012 | Zhou |
| 2013/0170126 A1 * | 7/2013 | Lee ........................ G06F 1/1654 |
| | | 361/679.17 |
| 2014/0193193 A1 * | 7/2014 | Wikander ............. G06F 1/1616 |
| | | 403/322.1 |
| 2014/0328014 A1 * | 11/2014 | Lan ....................... G06F 1/1681 |
| | | 361/679.27 |
| 2015/0138721 A1 * | 5/2015 | Liang .................... G06F 1/1632 |
| | | 361/679.44 |

(Continued)

FOREIGN PATENT DOCUMENTS

| | | |
|---|---|---|
| CN | 102758993 B | 12/2015 |
| TW | 201442355 A | 11/2014 |

(Continued)

*Primary Examiner* — Xanthia C Cunningham
(74) *Attorney, Agent, or Firm* — McClure, Qualey & Rodack, LLP (57) ABSTRACT

A portable electronic device comprises a body, a stationary magnetic element and a base. The stationary magnetic element is disposed at a periphery of the first groove. The connecting element of the base is disposed on the bottom plate of the base and including a second engaging surface and a second groove. An opening of the second groove is formed on the second engaging surface. The rotatable magnetic element is pivotally connected with the second groove. One end of the rotatable magnetic element can rotate in/out the second groove. When a distance between the first engaging surface and the second engaging surface is less than a predetermined value and the opening of the first groove faces to the opening of the second groove, the rotatable magnetic element is attracted by the stationary magnetic element to rotate out of the second groove and get into the first groove.

10 Claims, 7 Drawing Sheets

(56) References Cited

U.S. PATENT DOCUMENTS

| | | | | |
|---|---|---|---|---|
| 2015/0279535 A1* | 10/2015 | Arrington | ............ | G06F 1/1632 |
| | | | | 361/679.43 |
| 2016/0070299 A1* | 3/2016 | Chen | .................... | G06F 1/1615 |
| | | | | 361/679.3 |
| 2016/0282909 A1* | 9/2016 | Tzou | ..................... | G06F 1/1626 |
| 2016/0370826 A1 | 12/2016 | Wang et al. | | |
| 2017/0220076 A1* | 8/2017 | Gerbus | ................. | G06F 1/1681 |
| 2017/0308127 A1* | 10/2017 | Hillyerd | ............... | G06F 1/1656 |

FOREIGN PATENT DOCUMENTS

| | | |
|---|---|---|
| TW | M520751 U | 4/2016 |
| TW | I548971 B | 9/2016 |
| TW | I563364 B | 12/2016 |

\* cited by examiner

PORTABLE ELECTRONIC DEVICE

CROSS-REFERENCE TO RELATED APPLICATION

This application claims the priority benefit of Taiwan application serial No. 105143105, filed on Dec. 23, 2016. The entirety of the above-mentioned patent application is hereby incorporated by reference herein and made a part of specification.

BACKGROUND OF THE INVENTION

Field of the Invention

The disclosure relates to a portable electronic device.

Description of the Related Art

In recent years, tablet PCs are popular due to advantages such as light, small and portable. And various kinds of protective covers equipped with physical keyboards are launched to cooperate with tablet PCs for information input. However, it is not easy to detach the connection between the protective cover and the tablet PC. Moreover, the connection between the protective cover and the tablet PCs easily becomes loosen after detached many times.

BRIEF SUMMARY OF THE INVENTION

According to an aspect of the disclosure, a portable electronic device is provided. The portable electronic device comprises: a body, including a first engaging surface and a first groove, and an opening of the first groove is formed at the first engaging surface; a stationary magnetic element, disposed at a periphery of the first groove; and a base, including: a bottom plate; a connecting element, disposed on the bottom plate and the connecting element and including a second engaging surface and a second groove, and the opening of the second groove is formed on the second engaging surface; and a rotatable magnetic element, pivotally connected with the second groove, wherein one end of the rotatable magnetic element is adapted to rotate out or rotate in the second groove. When a distance between the first engaging surface and the second engaging surface is less than a predetermined value, and the opening of the first groove faces to the opening of the second groove, the rotatable magnetic element is attracted by the stationary magnetic element to rotate out of the second groove and get into the first groove.

According to an aspect of the disclosure, a portable electronic device is provided. The portable electronic device comprises: a body, including a first engaging surface and a first groove, wherein an opening of the first groove is formed at the first engaging surface; a rotatable magnetic element, pivotally connected with the first groove, wherein one end of the rotatable magnetic element is adapted to rotate out or rotate in the first groove; and a base, including: a bottom plate; a connecting element, disposed on the bottom plate and including a second engaging surface and a second groove, and the opening of the second groove is formed on the second engaging surface; and a stationary magnetic element, disposed at a periphery of the second groove, when a distance between the first engaging surface and the second engaging surface is less than a predetermined value and the opening of the first groove faces to the opening of the second groove, the rotatable magnetic element is attracted by the stationary magnetic element to rotate out of the first groove and get into the second groove.

DETAILED DESCRIPTION OF THE EMBODIMENTS

Please refer to FIG. 1 to FIG. 5. A body 11 and a base 12 of a portable electronic device 10 are engaged via a stationary magnetic element 13 and a rotatable magnetic element 123.

The portable electronic device 10 includes a body 11 and a base 12 detachably connects to each other. The body 11 includes a first engaging surface 111 and a first groove 112. The opening of the first groove 112 is formed at the first engaging surface 111. The stationary magnetic element 13 is disposed at the periphery of the first groove 112. The base 12 includes a bottom plate 121, a connecting element 122 and a rotatable magnetic element 123. The connecting element 122 is disposed on the bottom plate 121. An angle is formed between the connecting element 122 and the bottom plate 121. The connecting element 122 includes a second engaging surface 1221 and a second groove 1222. The opening of the second groove 1222 is formed at the second engaging surface 1221. The rotatable magnetic element 123 is pivotally connected with the second groove 1222. One end of the rotatable magnetic element 123 is able to rotate out of or rotate in from the second groove 1222. When the distance between the first engaging surface 111 and the second engaging surface 1221 of the body 11 is less than a predetermined value and the opening of the first groove 112 faces to the opening of the second groove 1222, the rotatable magnetic element 123 rotates out of the second groove 1222 and moves into the first groove 112 due to the magnetic attraction force F1 of the stationary magnetic element 13.

Figure 1:
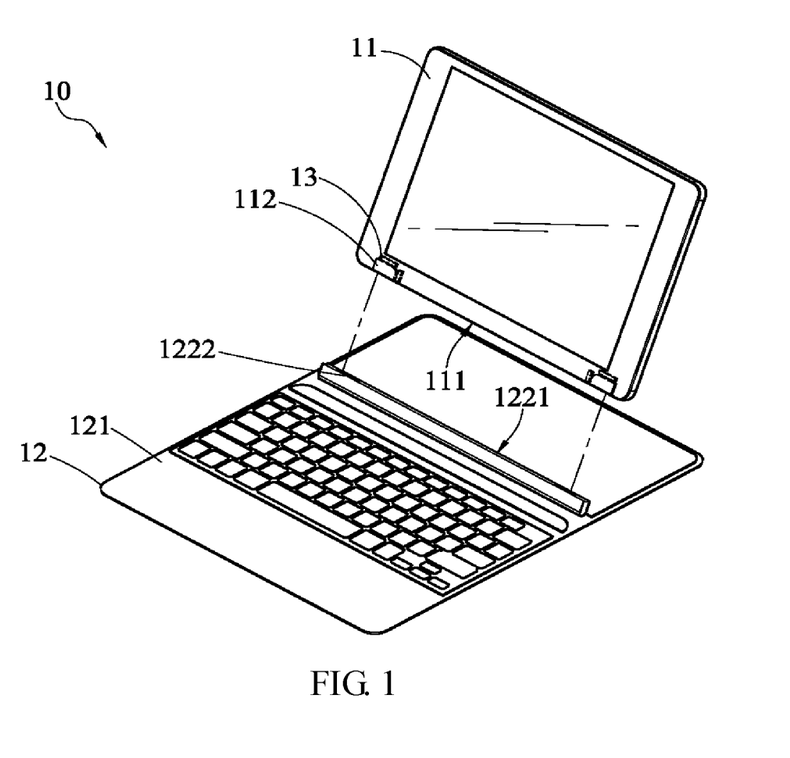
FIG. 1 is a schematic diagram showing a first state of a portable electronic device in an embodiment.
Figure 2:
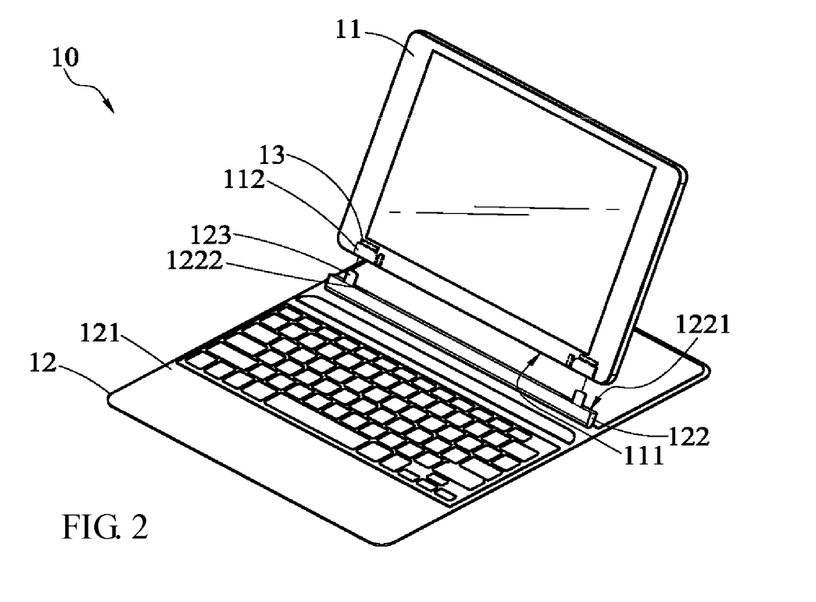
FIG. 2 is a schematic diagram showing a second state of a portable electronic device in an embodiment.
Figure 3:
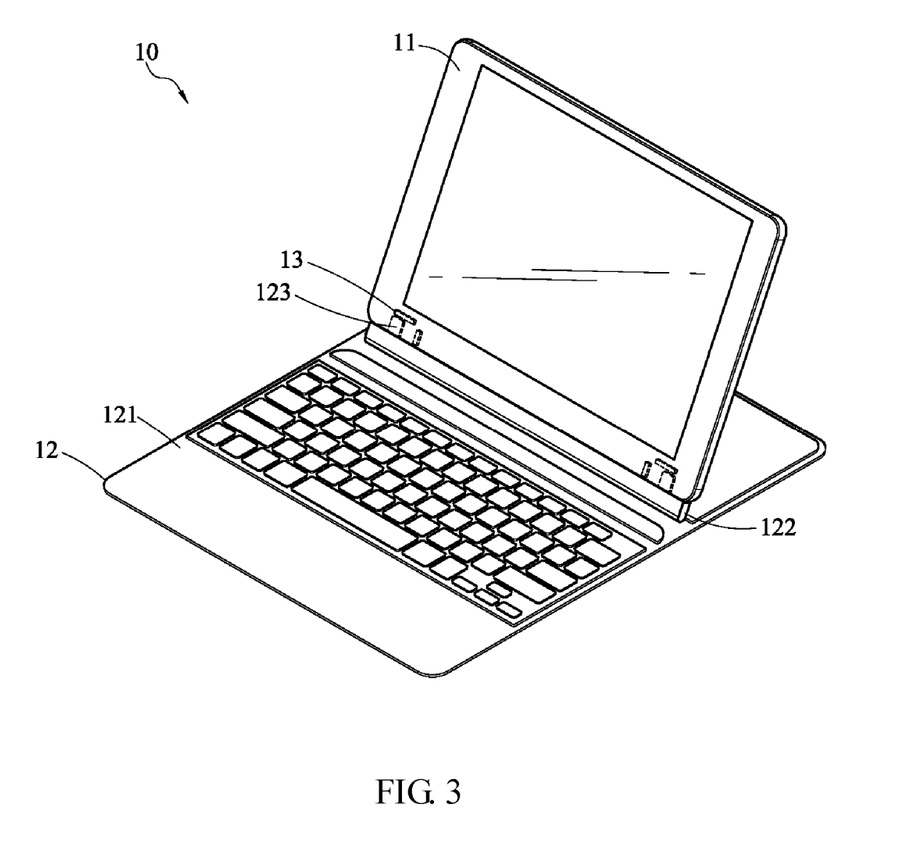
FIG. 3 is a schematic diagram showing a third state of a portable electronic device in an embodiment.
Figure 4:
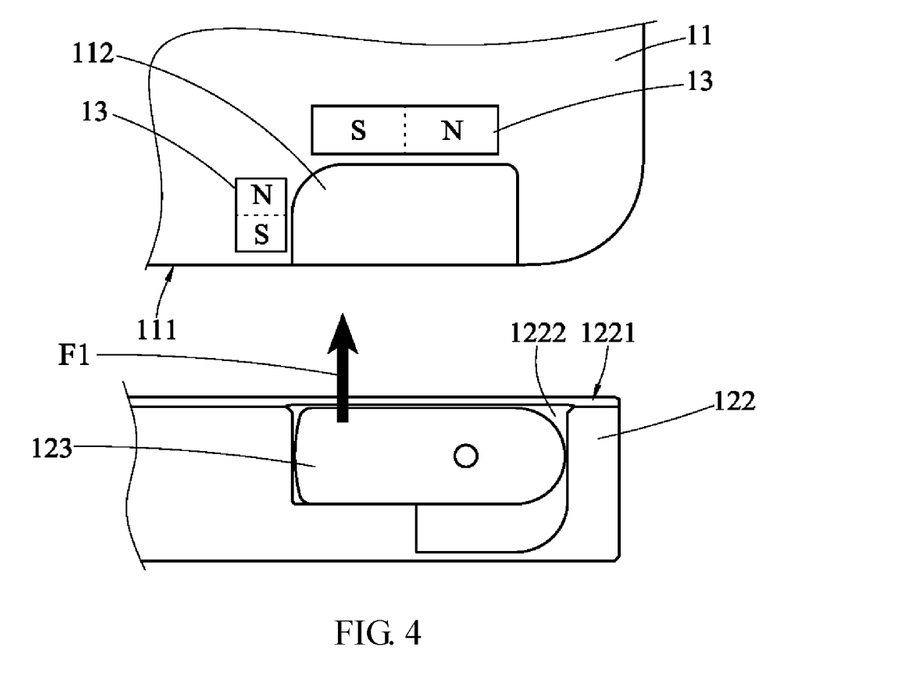
FIG. 4 is a partial enlarged diagram in an embodiment.
Figure 5:
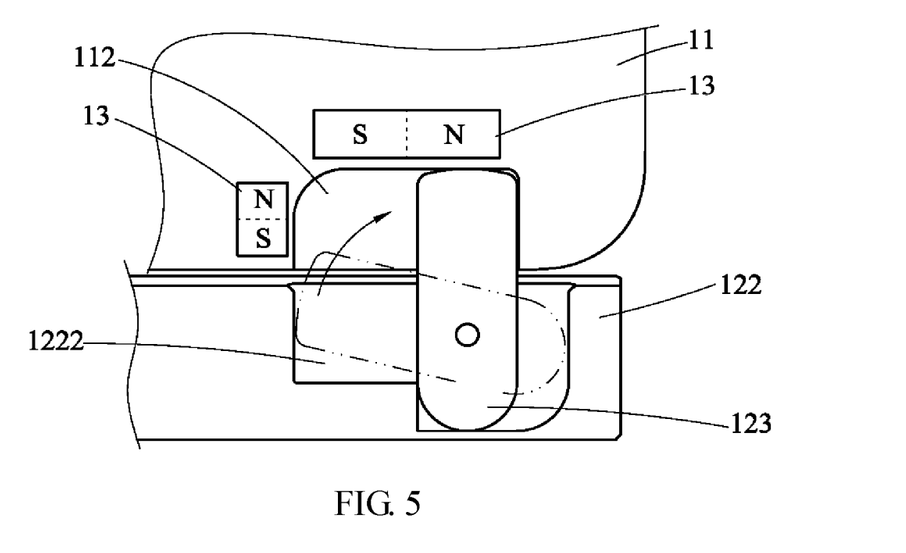
FIG. 5 is a partial enlarged diagram in an embodiment.

The stationary magnetic element 13 and the rotatable magnetic element 123 are combined in different connection ways by changing the magnetic attraction force between the stationary magnetic element 13 and the rotatable magnetic element 123. When the magnetic attraction force F1 between the stationary magnetic element 13 and the rotatable magnetic element 123 is large, and the distance between the first engaging surface 111 of the body 11 and the second engaging surface 1221 of the connecting element 122 is less than a predetermined distance, the rotatable magnetic element 123 rotates out of the second groove 1222 under the magnetic attraction force F1 of the stationary magnetic element 13. As shown in FIG. 2, the first groove 112 of the body 11 directly faces the rotatable magnetic element 123 which is already rotated out. Then, the rotatable magnetic element 123 is inserted into the first groove 112 to complete the connection between the body 11 and the base 12. In this connection way, the size of the opening of the first groove 112 is large enough to allow the rotating magnetic element 123 to be inserted. That is, the opening width of the first groove 112 is substantially equal to the width of the cross section of the rotatable magnetic element 123 which is rotated out.

When the magnetic attraction force between the stationary magnetic element 13 and the rotatable magnetic element 123 is weak, the magnetic attraction force F1 applied on the rotating magnetic element 123 is sufficient to rotate the rotating magnetic element 123 out of the second groove 1222 and get into the first groove 112 while the first engaging surface 111 contacts or almost contacts the second engaging surface 1221 as well as the opening of the first groove 112 faces to the opening of the second groove 1222. And the rotatable magnetic element 123 rotates into the first groove 112 to complete the connection of the body 11 and the base 12. In this connection way, the opening of the first groove 112 is large enough for the rotatable magnetic element 123 to be rotated in. That is, the width of the opening of the first groove 112 is substantially equal to or larger than the radius of the rotatable magnetic element 123 while rotation. Moreover, no precisely alignment is required for connection of the first groove 112 and the second groove 1222 by the way of "rotated into". For example, the two rotatable magnetic elements 123 are also rotated into the two first grooves 112 due to the magnetic attraction force when the first groove 112 is not precisely aligned with the second groove 1222. The description of "almost contact" is defined as the situation when the distance between the first engaging surface 111 and the second engaging surface 1221 is smaller than a maximum height of a part of the rotatable magnetic element 123 which protruded from the second engaging surface 1221.

The hand feel provided by inserting the rotatable magnetic element 123 into the first groove 112 is different that provided by rotating the rotatable magnetic element 123 into the first groove 112 When the distance between the first engaging surface 111 and the second engaging surface 1221 is less than a predetermined value and the opening of the first groove 112 is facing to the opening of the second groove 1222, the rotatable magnetic element 123 is rotated out of the second groove 1222 and inserts or rotates into the first groove 112 by the magnetic attraction force of the stationary magnetic element 13. Then, the connection between the body 11 and the base 12 is completed.

In the embodiment, under the magnetic attraction force F1, the rotatable magnetic element 123 rotates out of the first groove 112 in a linear motion instead of protruded from the first groove 112. When the body 11 and the base 12 are not connected, the long side of the rotatable magnetic element 123 is parallel to the long side of the connecting element 122 which provide enough accommodate space. As a result, the dimension of the connecting element 122 in the connection direction which perpendicular to the long side of the connecting element 122 is reduced.

The number of the first groove 112, the second groove 1222 and the rotatable magnetic element 123 is not limited herein. The number is various according to requirements, such as the requirement of satisfy the connection stability.

Figure 6:
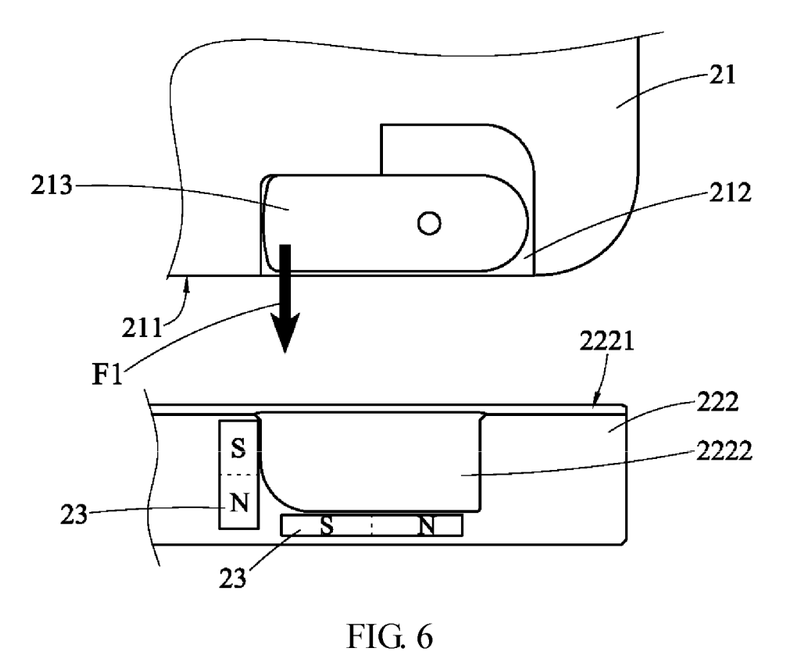
FIG. 6 is a partial enlarged diagram in a second embodiment.
Figure 7:
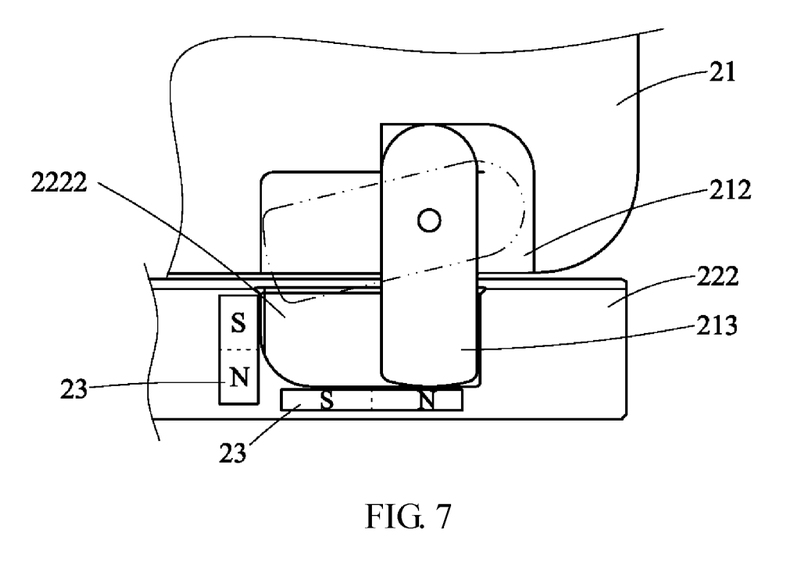
FIG. 7 is a partial enlarged diagram in a second embodiment.

FIG. 6 and FIG. 7 are partial enlarged diagrams in a second embodiment. The main difference between the second embodiment and the first embodiment is that the rotatable magnetic element 213 is pivotally connected to the first groove 212 of the body 21, and the stationary magnetic element 23 is configured at the periphery of the second groove 2222 of the connecting element 222. When the distance between the first engaging surface 211 and the second engaging surface 2221 is smaller than the predetermined value and the opening of the first groove is facing to the opening of the second groove, the rotatable magnetic element 213 rotates out of the first groove 212 and gets into the second groove 2222 of the connecting element 222 under the magnetic force F1 of the stationary magnetic element 23.

Figure 8:
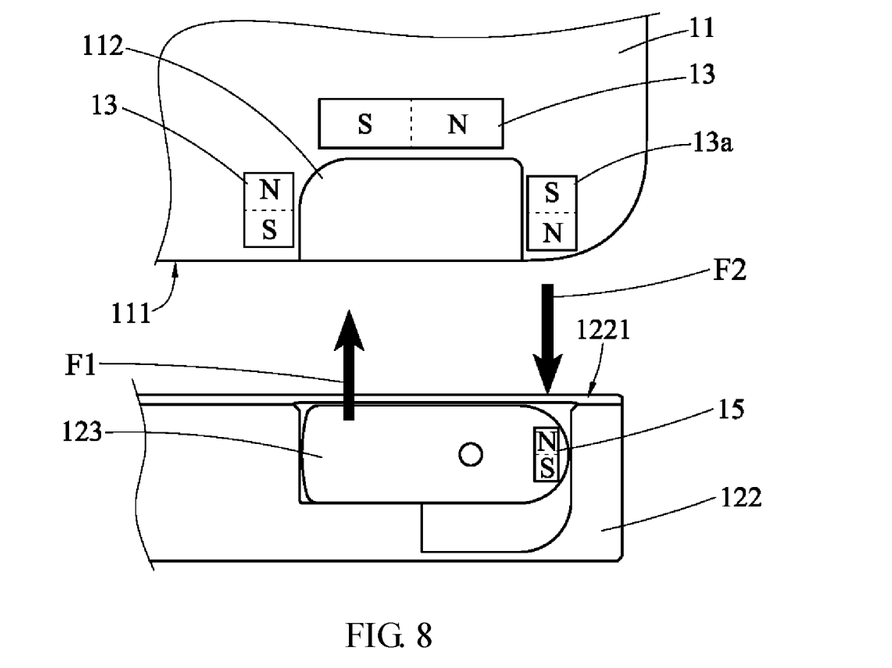
FIG. 8 is a partial enlarged diagram in a third embodiment.
Figure 9:
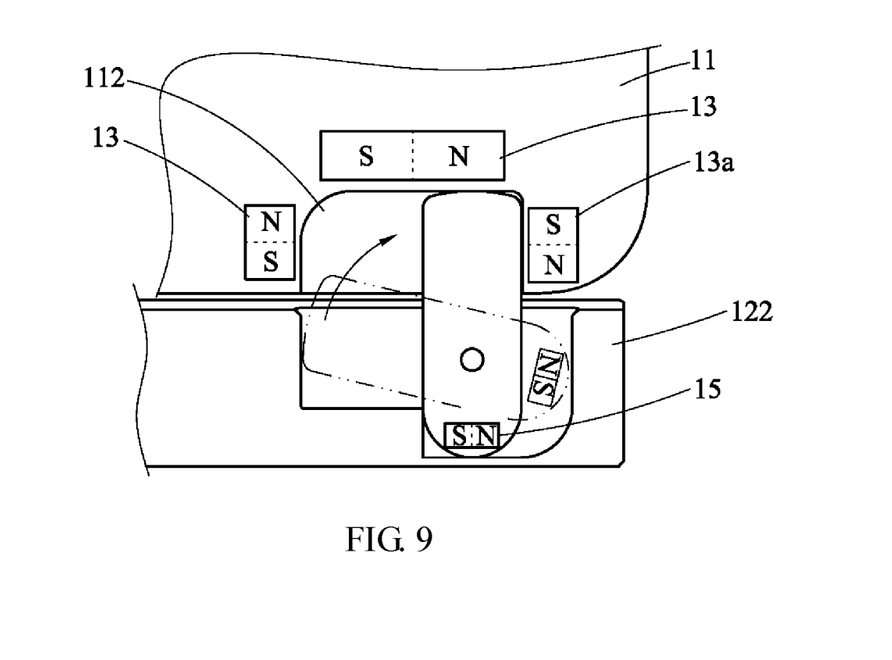
FIG. 9 is a partial enlarged diagram in a third embodiment.

FIG. 8 and FIG. 9 are partial enlarged diagrams in a third embodiment. In the third embodiment, an auxiliary magnetic element 15 is configured. The auxiliary magnetic element 15 is disposed on the other end of the rotatable magnetic element 123. In addition, at least one of the stationary magnetic elements 13 at the peripheral of the first groove 112 is configured corresponding to the auxiliary magnetic element 15. The auxiliary magnetic element 15 and the stationary magnetic element 13a are disposed with the same magnetic poles facing each other. Thus, when the distance between the first engaging surface 111 and the second engaging surface 1221 is less than a predetermined value, and the opening of the first groove 112 is facing to the opening of the second groove 1222, one end of the rotatable magnetic element 123 rotates toward inside of the second groove 1222 under the magnetic repulsion force F2 between the stationary magnetic element 13a and the auxiliary magnetic element 15. In other words, the magnetic attraction force F1 and the magnetic repulsion force F2 applied on the rotatable magnetic element 123 have the same torque. Consequently, when the distance between the first engaging surface 111 and the second engaging surface 1221 is less than a predetermined value, the force applied on the rotatable magnetic element 123 is sufficient for the rotatable magnetic element 123 to rotate out of the second groove 1222. In addition, the auxiliary magnetic element 15 is also adaptable for the second embodiment. Then, the rotatable magnetic element 213 is ensured to rotate out of the first groove 212 when the distance between the first engaging surface 111 and the second engaging surface 1221 is less than a predetermined value.

Figure 10:
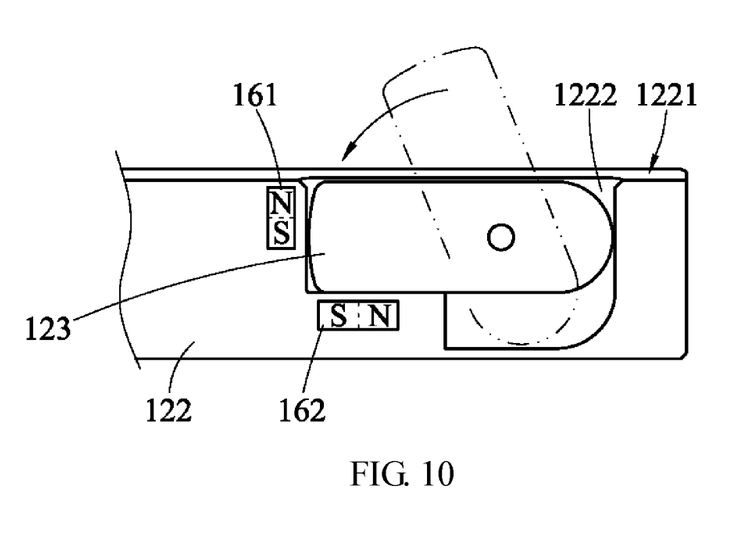
FIG. 10 is a schematic diagram showing a portable electronic device in a fourth embodiment.

FIG. 10 is a schematic diagram showing a portable electronic device in a fourth embodiment. The positioning magnetic elements 161 and 162 are configured at the periphery of the second groove 1222. As a result, when the body 11 is detached from the base 12, one end of the rotatable magnetic element 123 is automatically rotated back into the second groove 1222 due to the attraction of the positioning magnet elements 161 and 162. In addition, the rotatable magnetic element 123 is fixed in the second groove 1222 by the magnetic attraction force. Then, the rotatable magnetic element 123 would not be rotated out due to the shake of the base 12. As shown in FIG. 10, the positioning magnetic elements 161 and 162 are disposed at the peripheral of one end of the second groove 1222 relative to the other end connecting with the rotatable magnetic element 123. The magnetic attraction force between the positioning magnet elements 161,162 and the rotatable magnetic element 123 should be smaller than the magnetic attraction force between the stationary magnetic element 13 and the rotatable magnetic element 123. Otherwise, the rotatable magnetic element 123 would fail to rotate out the second groove 1222. In an embodiment, the magnet pole of the positioning magnetic elements 161 and 162 faces the opposite magnet pole of the positioning magnetic element 13 at the body 11, and thus the body 11 and the base 12 are connected more stably.

Figure 11:
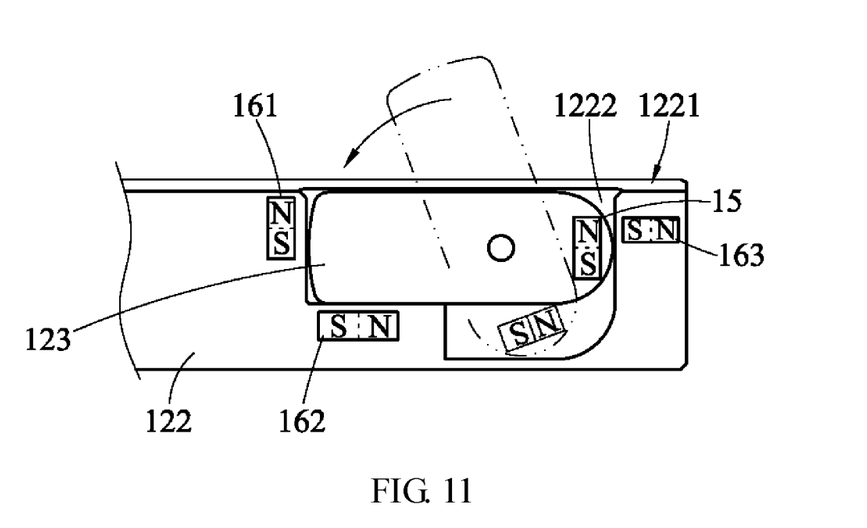
FIG. 11 is another schematic diagram showing a portable electronic device in a fourth embodiment.

FIG. 11 is another schematic diagram showing a portable electronic device in a fourth embodiment. In the embodiment, the auxiliary magnetic element 15 is configured at the other end of the rotatable magnetic element 123. The positioning magnetic elements 161 and 162 are disposed at the periphery of the second groove 1222 corresponding to one end of the rotatable magnetic element 123. In the embodiment, the positioning magnetic element 163 is configured at the periphery of the second groove 1222 corresponding to the other end of the rotatable magnetic element 123 having the auxiliary magnetic element 15. One magnetic pole (for example, S pole) of the positioning magnetic element 163 is positioned adjacent to the opposite magnetic pole (for example, N pole) of the auxiliary magnetic element 15. The other magnetic pole (for example, N pole) of the positioning magnetic element 163 is positioned far away the auxiliary magnetic element 15. Then, during the rotating of the rotatable magnetic element 123, the direction of the torque on the rotatable magnetic element 123 from the positioning magnetic element 163 would not be opposite to that of the torque on the rotatable magnetic element 123 from the stationary magnetic element 13. In an embodiment, the positioning magnetic elements 161 and 162 are saved. For example, the positioning magnetic elements 161 and 162 are not configured, and the positioning magnet element 163 is configured.

Figure 12:
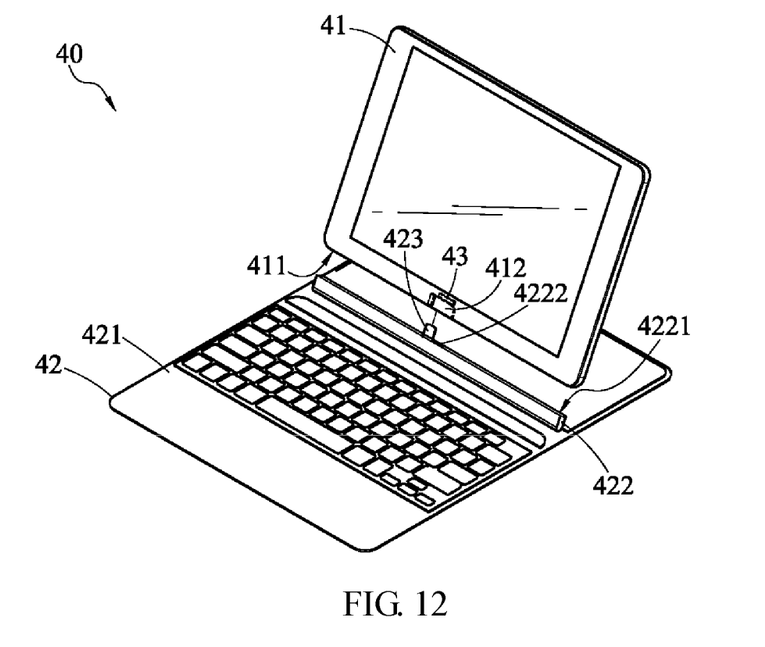
FIG. 12 is a schematic diagram showing a first state of a portable electronic device in a fifth embodiment.
Figure 13:
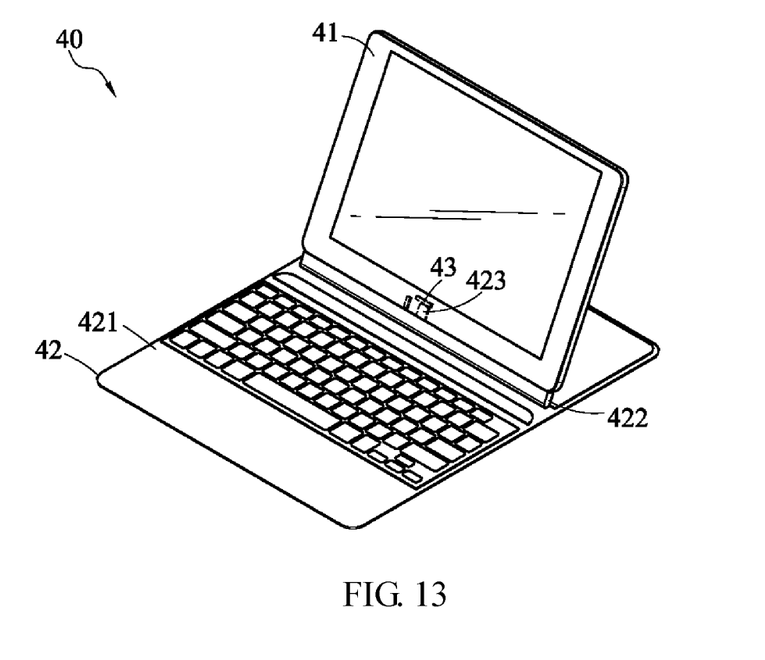
FIG. 13 is a schematic diagram showing a second state of a portable electronic device in a fifth embodiment.

FIG. 12 and FIG. 13 show a process that the body 41 and the base 42 of the portable electronic device 40 are connected in a fifth embodiment. In the above embodiments, two first grooves and two second grooves are configured. In this embodiment, the number of the first groove 412 configured at the body 41 of the portable electronic device 40 is one. The stationary magnetic element 43 is configured at the periphery of the first groove 412. The base 42 includes a bottom plate 421, a connecting element 422 and a rotatable magnetic element 423. The number of the second groove 4222 formed at the connecting element 422 is one. The rotating magnetic element 423 is pivotally connected with the second groove 4222. When the distance between the first engaging surface 411 of the body 41 and the second engaging surface 4221 of the connecting element 422 is less than the predetermined value, and the opening of the first groove 412 faces to the opening of the second groove 4222, the rotating magnetic element 423 is attracted by the positioning magnetic element 43 to rotate out of the second groove 4222 and get into the first groove 412. Then, the body 41 and the base 42 are combined together.

In one embodiment, the stationary magnetic element and the positioning magnetic element is made of a magnet. The rotating magnetic element is made of a metal which is attracted to the magnet. In an embodiment, the first engaging surface of the body is a convex surface while the second engaging surface of the connecting element is a concave surface. Then, the first engaging surface and the second engaging surface are easy to be aligned with each other.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A portable electronic device, comprising:
   a body, including a first engaging surface and a first groove, and an opening of the first groove is formed at the first engaging surface;
   a stationary magnetic element, disposed at a periphery of the first groove; and
   a base, including:
   a bottom plate;
   a connecting element, disposed on the bottom plate and including a second engaging surface and a second groove, and the opening of the second groove is formed on the second engaging surface;
   a rotatable magnetic element, pivotally connected with the second groove, wherein one end of the rotatable magnetic element is adapted to rotate out or rotate in the second groove, when a distance between the first engaging surface and the second engaging surface is less than a predetermined value, and the opening of the first groove faces to the opening of the second groove, the rotatable magnetic element is attracted by the stationary magnetic element to rotate out of the second groove and get into the first groove; and
   an auxiliary magnetic element disposed on the other end of the rotatable magnetic element configured such that the other end of the rotatable magnetic element rotates toward the second groove under a magnetic repulsion force between the auxiliary magnetic element and the rotatable magnetic element.

2. The portable electronic device according to claim 1, wherein the body includes a plurality of the first grooves, the stationary magnetic element is disposed at the periphery of each of the first grooves, the connecting element of the base includes a plurality of the second grooves, the rotatable magnetic element is pivotally connected with each of the second grooves.

3. The portable electronic device according to claim 2, wherein when the distance between the first engaging surface and the second engaging surface is less than the predetermined value, and when the first groove faces to the second groove, the other end of the rotatable magnetic element rotates toward the second groove.

4. The portable electronic device according to claim 3, wherein the portable electronic device further includes at least one positioning magnetic element configured at the peripheral of one end of the second groove relative to the other end connecting with the rotatable magnetic element, one magnetic pole of the positioning magnetic element is positioned adjacent to an opposite magnetic pole of the auxiliary magnetic element, and the other magnetic pole of the positioning magnetic element is positioned far away the auxiliary magnetic element.

5. The portable electronic device according to the claim 1, further comprising at least one positioning magnetic element configured at a peripheral of one end of the second groove relative to the one end of connecting with the rotatable magnetic element.

6. A portable electronic device, comprising:
   a body, including a first engaging surface and a first groove, wherein an opening of the first groove is formed at the first engaging surface;

a rotatable magnetic element, pivotally connected with the first groove, wherein one end of the rotatable magnetic element is adapted to rotate out or rotate in the first groove; and a base, including:

a bottom plate;

a connecting element, disposed on the bottom plate and including a second engaging surface and a second groove, and the opening of the second groove is formed on the second engaging surface;

a stationary magnetic element, disposed at a periphery of the second groove, when a distance between the first engaging surface and the second engaging surface is less than a predetermined value and the opening of the first groove faces to the opening of the second groove, the rotatable magnetic element is attracted by the stationary magnetic element to rotate out of the first groove and get into the second groove; and an auxiliary magnetic element disposed on the other end of the rotatable magnetic element configured such that the other end of the rotatable magnetic element rotates toward the second groove under a magnetic repulsion force between the auxiliary magnetic element and the rotatable magnetic element.

7. The portable electronic device according to the claim 6, wherein the body includes a plurality of the first grooves, the rotatable magnetic element is connected with each of the first grooves, the connecting element of the base includes a plurality of the second grooves, the stationary magnetic element is disposed at the periphery of each of the second grooves.

8. The portable electronic device according to the claim 7, wherein when the distance between the first engaging surface and the second engaging surface is less than the predetermined value, and when the first groove faces to the second groove, the other end of the rotatable magnetic element rotates toward the first groove.

9. The portable electronic device according to the claim 8, wherein the portable electronic device further includes at least one positioning magnetic element configured at the peripheral of one end of the first groove relative to the other end connecting with the rotatable magnetic element, one magnetic pole of the positioning magnetic element is positioned adjacent to an opposite magnetic pole of the auxiliary magnetic element, and the other magnetic pole of the positioning magnetic element is positioned far away the auxiliary magnetic element.

10. The portable electronic device according to the claim 6, further comprising at least one positioning magnetic element configured at a peripheral of one end of the first groove relative to the one end connecting with the rotatable magnetic element.

* * * * *